US012614975B2

(12) United States Patent
Guo et al.

(10) Patent No.: US 12,614,975 B2
(45) Date of Patent: Apr. 28, 2026

(54) SWITCHING POWER SUPPLY AND ELECTRONIC DEVICE

(71) Applicant: HYASIC INCORPORATION, Cupertino, CA (US)

(72) Inventors: Chunming Guo, Shenzhen (CN); Haibin Xiao, Shenzhen (CN); Huorong Lin, Shenzhen (CN); Xufei Wang, Shenzhen (CN)

(73) Assignee: HYASIC INCORPORATION, Cupertino, CA (US)

( * ) Notice: Subject to any disclaimer, the term of this patent is extended or adjusted under 35 U.S.C. 154(b) by 222 days.

(21) Appl. No.: 18/361,612

(22) Filed: Jul. 28, 2023

(65) Prior Publication Data

US 2025/0038655 A1 Jan. 30, 2025

(51) Int. Cl.
| | |
|---|---|
| *H02M 1/44* | (2007.01) |
| *H02M 1/00* | (2007.01) |
| *H02M 1/12* | (2006.01) |
| *H02M 1/34* | (2007.01) |
| *H02M 3/335* | (2006.01) |

(52) U.S. Cl.
CPC ........... *H02M 1/44* (2013.01); *H02M 1/0064* (2021.05); *H02M 1/123* (2021.05); *H02M 3/33507* (2013.01); *H02M 1/348* (2021.05); *H02M 3/33523* (2013.01)

(58) Field of Classification Search
CPC ...... H02M 1/0064; H02M 1/44; H02M 1/123; H02M 1/348; H02M 3/33507; H02M 3/33523
See application file for complete search history.

(56) References Cited

U.S. PATENT DOCUMENTS

2019/0074132 A1* 3/2019 Park ........................ H02M 3/28

FOREIGN PATENT DOCUMENTS

| | | |
|---|---|---|
| CN | 102231318 A | 11/2011 |
| CN | 204167063 U | 2/2015 |
| CN | 105261461 A | 1/2016 |
| CN | 206497817 U | 9/2017 |
| KR | 20130005103 A | 1/2013 |

OTHER PUBLICATIONS

Examination Report, issued in CN202210356709.X (priority application), by CNIPA, dated Dec. 17, 2025.

* cited by examiner

*Primary Examiner* — Jue Zhang
(74) *Attorney, Agent, or Firm* — Zhu Lehnhoff LLP

(57) ABSTRACT

A switching power supply and an electronic device includes a transformer, which includes a frame and a multi-layer winding structure arranged on the frame, different winding units are distributed at intervals along a target direction; at least one winding unit includes a first winding of the primary side of the transformer; at least one winding unit includes a second winding of the secondary side of the transformer; at least one winding unit includes a shielding winding; at least one group of shielding windings and the first winding are wound in parallel in the same layer, and/or: at least one group of shielding windings are distributed between the first winding and the second winding; the shielding winding is located on the primary side of the transformer; at least one end of the shielding winding is connected to an oscillation reduction unit for eliminating or weakening oscillation.

20 Claims, 12 Drawing Sheets

Frequency:7. 579MHz    AV:45. 6 PK:63. 9

Frequency/MHz

Frequency:158MHz    AV:42. 3 PK:58. 1

Frequency/MHz

SWITCHING POWER SUPPLY AND ELECTRONIC DEVICE

CROSS REFERENCE TO THE RELATED APPLICATIONS

This application is based upon and claims priority to Chinese Patent Applications No. CN202210302064.1, filed on Mar. 25, 2022 and No. CN202210356709.X, filed on Apr. 6, 2022, the entire contents of which are incorporated herein by reference.

TECHNICAL FIELD

The present invention relates to a power supply, in particular, to a switching power supply and an electronic device.

BACKGROUND

In a switching power supply, a transformer is usually used to achieve power conversion. The switching power supply must pass an electromagnetic interference (EMI) test. EMI is divided into a common mode part and differential mode part, and the suppression methods are also different. The differential mode part is primarily filtered out by using methods such as adding a X capacitor and a differential mode inductor. In addition to conventional methods such as adding a common mode inductor and a Y capacitor, adding a shielding layer (such as a shielding winding) inside the transformer to reduce the common mode current is also a commonly used method for the common mode part.

In existing related technologies, even if the shielding winding is introduced, oscillations will still occur at certain points of conduction and certain points of radiation, resulting in an increase in EMI.

SUMMARY

The present invention provides a switching power supply and an electronic device to solve the problem of causing an increase in EMI.

According to a first aspect of the present invention, a switching power supply is provided, including a transformer, wherein the transformer includes a frame, and the transformer further includes multi-layer winding structure arranged on the frame, and different winding units of the multi-layer winding structure are distributed at intervals along a target direction;

at least one winding unit of the multi-layer winding structure includes a first winding of a primary side of the transformer; at least one winding unit of the multi-layer winding structure includes a second winding of a secondary side of the transformer; at least one winding unit of the multi-layer winding structure includes a shielding winding;

in the multi-layer winding structure, at least one group of shielding windings is wound in parallel in the same layer as the first winding, and/or: at least one group of shielding windings is distributed between the first winding and the second winding;

wherein the shielding winding is located on the primary side of the transformer; at least one end of the shielding winding is connected with an oscillation reduction unit for eliminating or weakening oscillation.

Optionally, the oscillation reduction unit includes a first capacitor directly or indirectly connected in parallel to both ends of the shielding winding.

Optionally, at least one oscillation reduction unit further includes a first resistor, the first capacitor is connected in series with the first resistor and then connected in parallel to both ends of the shield winding.

Optionally, the number of shielding windings is two groups, the oscillation reduction unit includes a second capacitor, the second capacitor is connected between first ends of the two groups of shielding windings, second ends of the two groups of shielding windings are connected to the ground terminal or the power input terminal.

Optionally, the winding unit of the Lth layer of the multi-layer winding structure comprises the second winding;

the number of shielding windings is one group, and the winding unit of the Nth layer of the multi-layer winding structure comprises the shielding winding;

the number of first windings is at least two groups, two groups of which are respectively a primary winding and a power supply winding;

the winding unit of the Jth layer of the multi-layer winding structure comprises the first winding, which is the primary winding, the winding unit of the Kth layer of the multi-layer winding structure comprises the first winding, which is the power supply winding;

wherein L is a positive integer, and N is a positive integer greater than L;

wherein J is a positive integer greater than or equal to N, K is a positive integer greater than J, or: K is a positive integer greater than or equal to N, and J is a positive integer greater than K.

Optionally, Wherein, L=1, N=2; and

J=3, K=4, or: J=4, K=3.

Optionally, the winding unit of the Lth layer of the multi-layer winding structure comprises the second winding;

the number of shielding windings is two groups, which are respectively a first shielding winding and a second shielding winding; the Mth winding unit of the multi-layer winding structure comprises the first shielding winding, and the winding unit of the Nth layer of the multi-layer winding structure comprises the second shielding winding; a first end of the first shielding winding and a first end of the second shielding winding are commonly connected to the first winding;

the number of first windings is three groups, which are a first primary winding, a second primary winding, and a power supply winding; the first primary winding and the second primary winding are connected in series, and the winding unit of the Oth layer of the multi-layer winding structure comprises the first primary winding, the Pth winding unit of the multi-layer winding structure comprises the second primary winding, and the Qth winding unit of the multi-layer winding structure comprises the power supply winding;

wherein, L is a positive integer greater than or equal to 2, M is a positive integer less than L, N is a positive integer greater than L, and O is a positive integer less than or equal to M;

Q is a positive integer greater than or equal to N, P is a positive integer greater than Q, or: P is a positive integer greater than or equal to N, Q is a positive integer greater than J.

Optionally, L=3, M=2, N=4, 0=1; and

P=5, Q=6, or: Q=5, P=6.

Optionally, one of the first winding is a primary winding of the transformer, a first end of the primary winding is directly or indirectly connected to the power input terminal, a second end of the primary winding is directly or indirectly connected to a first end of a switch tube, a second end of the switch tube is connected to the ground terminal;

one end of each shielding winding is connected to the ground terminal, or one end of each shielding winding is connected to the power input terminal;

the oscillation reduction unit is specifically used to eliminate or weakening oscillation when the switch tube is turned on and turned off.

Optionally, the switching power supply further includes a second resistor, a third capacitor, a first diode, a second diode, and a fourth capacitor; the second winding is a secondary winding of the transformer;

a first end of the second resistor after connected in parallel with the third capacitor is connected to the power input terminal, and a second end of which is connected to a negative electrode of the first diode, a positive electrode of the first diode is connected to the first end of the switch tube, a first end of the fourth capacitor is connected to a first end of the secondary winding, a second end of the fourth capacitor is connected to a positive electrode of the second diode, a negative electrode of the second diode is connected to a second end of the secondary winding.

According to the second aspect of the present invention, an electronic device is provided, including the switching power supply disclosed in the first aspect of the present invention and its optional embodiments.

In the switching power supply and electronic device provided by the present invention, it is creatively discovered that there is also leakage inductance and coupling capacitance between the shielding winding and the first winding (such as the primary winding) of the transformer. Consequently, oscillations can occur during the turning on and off of the switch tube on the primary side of the transformer, caused by the leakage inductance and distributed capacitance. These oscillations will cause an increase of EMI at corresponding points. Based on this discovery, the present invention connects an oscillation reduction unit to the shielding winding, thereby effectively reducing or avoiding the increase of EMI caused by oscillations. In specific embodiments, the oscillation reduction unit adopts capacitors (in some examples, also including resistors), which can effectively reduce the EMI of critical points at a lower cost by simply introducing capacitors (or capacitors and resistors).

BRIEF DESCRIPTION OF DRAWINGS

To describe the technical solutions in the embodiments of the present invention or in the prior art more clearly, accompanying drawings required to describe the embodiments or the prior art are briefly described below. It is obvious that the accompanying drawings described below are only some embodiments of the present invention. It is apparent to those of ordinary skill in the art that other drawings may be further obtained based on the accompanying drawings without inventive effort.

DESCRIPTION OF REFERENCE SIGNS

Figures 1, 2:
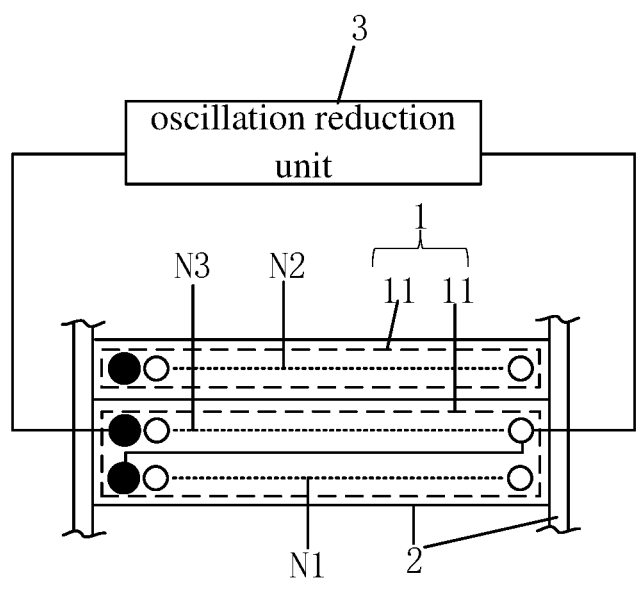
FIG. 1 is a first schematic construction diagram of a switching power supply in an embodiment of the present disclosure.
FIG. 2 is a second schematic construction diagram of a switching power supply in an embodiment of the present disclosure.
Figure 3:
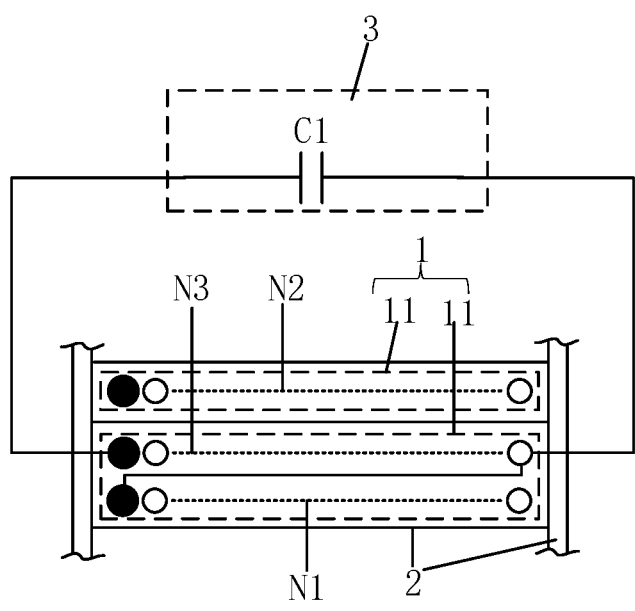
FIG. 3 is a third schematic construction diagram 3 of a switching power supply in an embodiment of the present disclosure.
Figure 4:
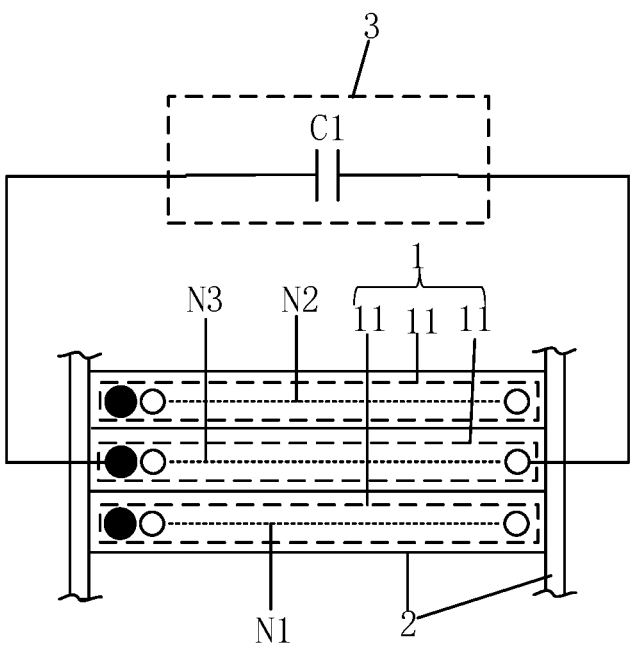
FIG. 4 is a fourth schematic construction diagram 4 of a switching power supply in an embodiment of the present disclosure.
Figure 5:
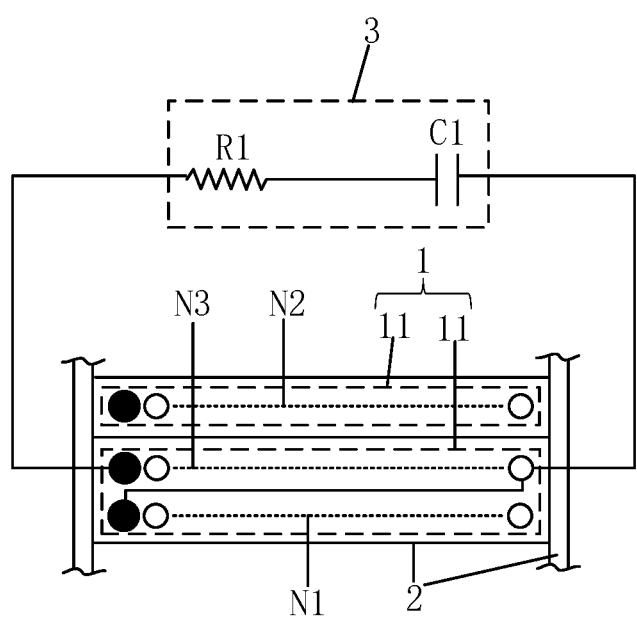
FIG. 5 is a fifth schematic construction diagram 5 of a switching power supply in an embodiment of the present disclosure.
Figure 6:
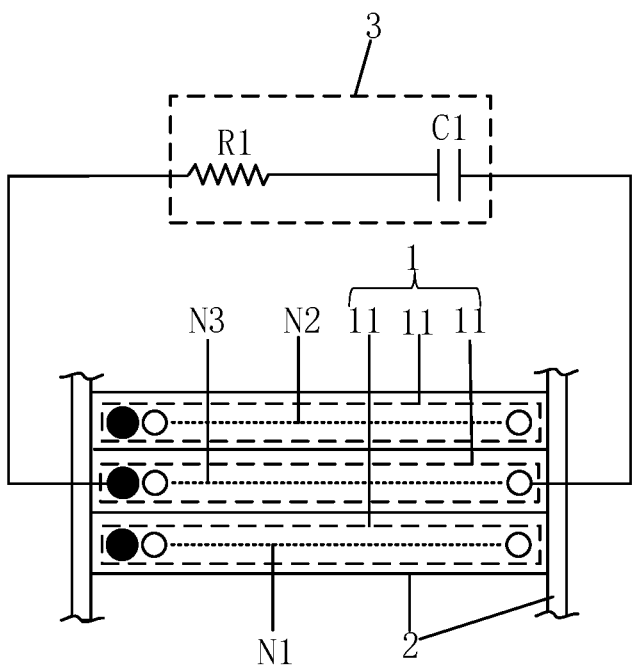
FIG. 6 is a sixth schematic construction diagram 6 of a switching power supply in an embodiment of the present disclosure.
Figure 7:
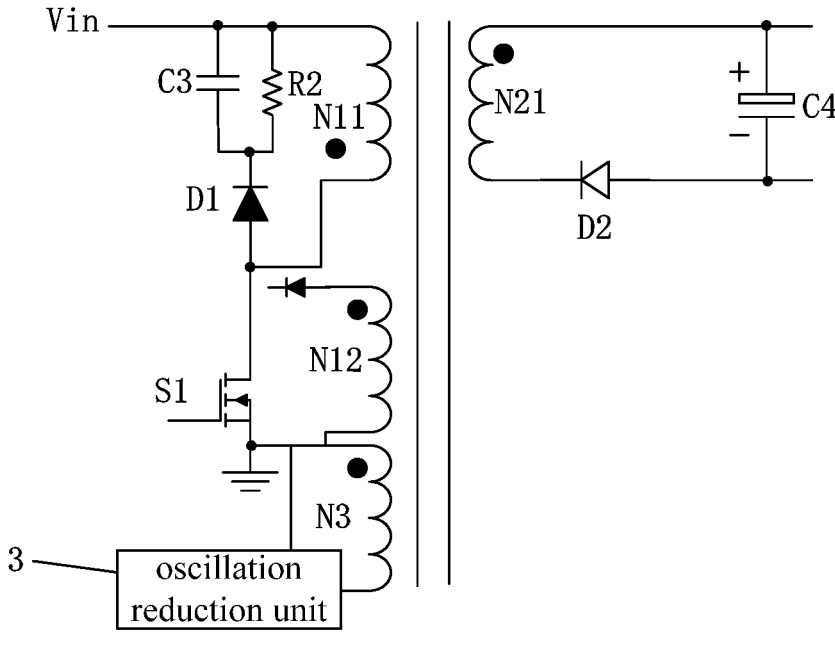
FIG. 7 is a first schematic circuit diagram of a switching power supply in an embodiment of the present disclosure.

1—multi-layer winding structure;

11—winding unit;

2—frame;

3—oscillation reduction unit;

N1—first winding;

N11—primary winding;

N111—first primary winding;

N112—second primary winding;

N2—second winding;

N21—secondary winding;

N3—shielding winding;
N31—first shielding winding;
N32—second shielding winding.

DETAILED DESCRIPTION OF THE EMBODIMENTS

The technical solutions in the embodiments of the present disclosure will be clearly and completely described below in conjunction with the accompanying drawings in the embodiments of the present disclosure. It is obvious that the described embodiments are only part but not all of the embodiments of the present disclosure. All other embodiments obtained by those skilled in the art without creative efforts based on the embodiments in the present disclosure are within the protection scope of the present disclosure The terms such as "upper", "lower", "upper end", "lower end", "lower surface", "upper surface", and the like indicating positional relationships are based on the orientation or positional relationships shown in the drawings. They are used for the convenience of describing the present invention and simplifying the description, and should not be interpreted as indicating or implying that the device or component referred to must have a specific orientation, be constructed or operated in a specific orientation. Therefore, they should not be understood as limitations of the present invention.

In the description of the present invention, the terms "first" and "second" are used for descriptive purposes only and should not be understood as indicating or implying relative importance or a specific number of the indicated technical features. Thus, features labeled with "first" or "second" may include one or more of such features, either explicitly or implicitly.

In the description of the present invention, the term "multiple" means multiple, such as two, three, four, etc., unless otherwise specifically limited.

In the description of the present invention, unless otherwise specifically defined and limited, terms such as "connected" should be broadly interpreted. For example, it can be a fixed connection, a detachable connection, or an integral connection; it can be a mechanical connection, an electrical connection, or a communication connection; it can be a direct connection or an indirect connection through an intermediate medium; it can be an internal connection within two components or an interactive relationship between two components. Ordinary skilled persons in the field can understand the specific meanings of the above terms in the present invention based on specific circumstances.

The technical solutions of the present invention are described in detail below with specific embodiments. The following specific embodiments may be combined with each other, and the same or similar concepts or processes may not be repeated in some embodiments.

Please refer to FIG. 1 and FIG. 2, the embodiments of the present invention provide a switching power supply, including a transformer. The transformer includes a frame 2, which can be understood as a component or combination of components capable of assembly of windings. Regardless of variations in shape, structure, or material of the frame 2, it remains within the scope of the embodiments of the present invention. Existing frames 2 in the field can also be used as alternative solutions. In some examples, the iron core can be used as a part of the frame 2, while in other examples, the iron core can be installed on the frame 2.

The transformer further includes a multi-layer winding structure 1 arranged on the frame 2, and different winding units 11 of the multi-layer winding structure 1 are distributed at intervals along a target direction.

The target direction may be understood as the direction from top to bottom or from bottom to top as shown in FIG. 1 and FIG. 2 and the distributed at intervals may be understood as: there is space or solid structure (e.g., the frame 2) separating adjacent winding units along the target direction. In specific examples, the windings in each layer can be continuous and not separated. In one example, the frame can form structural layers to differentiate different winding units, such as stacked layers. Therefore, windings in different structural layers can be understood as different winding units.

The dimensions, number of turns, directions, starting point positions, etc. of some windings shown in the diagram are the same or similar. However, in actual implementations, the dimensions, number of turns, directions, and starting point positions of each winding may be different. Namely, the windings shown in the drawings are for illustrative purposes only. In addition, the end marked with black dots in the drawings is the dotted terminal, which is also the starting point of the transformer.

At least one winding unit 11 of the multi-layer winding structure 1 includes a first winding N1 of the primary side of the transformer. At least one winding unit 11 of the multi-layer winding structure 1 includes a second winding N2 of the secondary side of the transformer (e.g., the secondary winding N21). At least one winding unit 11 of the multi-layer winding structure 1 includes a shield winding N3.

The first winding N1 can be any other winding on the primary side except for the shielding winding, please refer to FIG. 1 to FIG. 19, for example, the first winding N1 can be a primary winding N11 used for power conversion, or a power supply winding N12 used to obtain electrical energy and provide power to other circuit components. In other examples, it can be an auxiliary winding that serves other functions (e.g., power supply, sampling).

The second winding N2 can be any winding on the secondary side, please refer to FIG. 1 to FIG. 19, for example, the second winding N2 can be a secondary winding N21 used for power conversion. In other examples, it can be an auxiliary winding that used for other functions (e.g., power supply, sampling).

Figure 13:
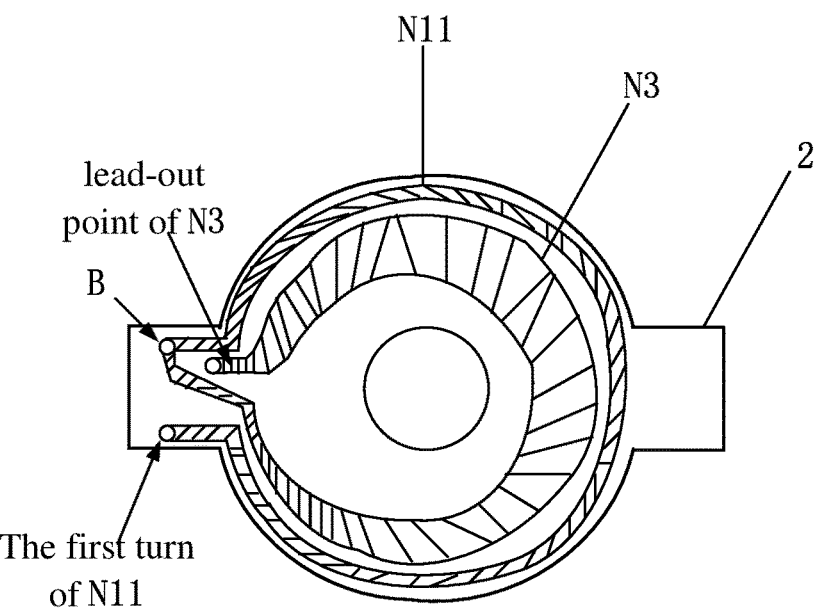
FIG. 13 is a partial structural diagram of a transformer according in an embodiment of the present disclosure.
Figure 14:
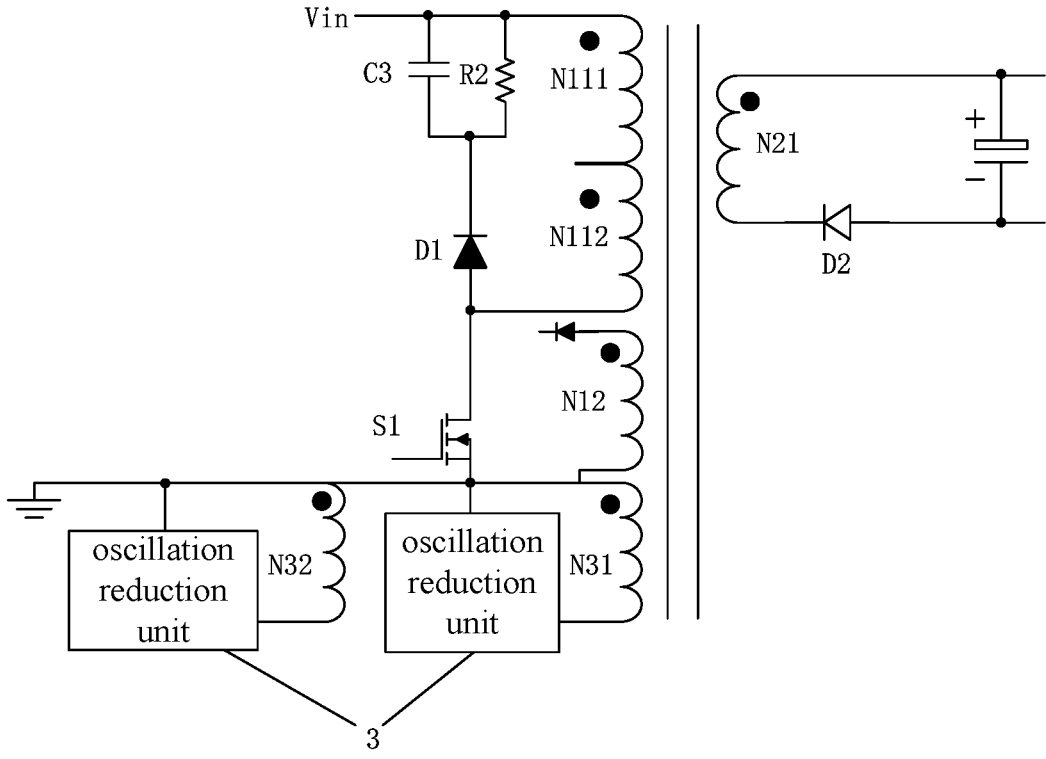
FIG. 14 is a sixth schematic circuit diagram of a switching power supply in an embodiment of the present disclosure.

In the example shown in FIG. 1, at least one group of shield windings N3 is wound in parallel with the first winding N1 in the same layer. In FIG. 1, in order to clearly display the shield windings N3 and the first winding N1, the shield windings N3 and the first winding N1 are plotted as an up and down relationship. In specific implementations, the shield windings N3 and the first winding N1 can be wound on the same plane. For example, FIG. 13 shows a primary winding (i.e., one type of first winding) and the shield winding N3 on the same plane. In other examples, they can be wound on different planes. By using the shield winding N3, common-mode current between the first winding N1 and the second winding N2 can be shielded. For example, when the shield winding is placed between the power supply winding and the secondary winding, it can shield the common-mode current.

In the example shown in FIG. 2, at least one group of shield windings N3 is distributed between the first winding N1 and the second winding N2 in the multi-layer winding structure. In the case where the shield windings N3 are distributed between the first winding N1 and the second winding N2, the winding units of the shield windings N3 can be directly adjacent to the first winding N1 and the second winding N2 (as shown in FIG. 2), or they can be non-directly adjacent. The main shield winding N3 is distributed between the first winding N1 and the second winding N2, whether directly adjacent or not, can be understood as an alternative solution.

In one embodiment of the present invention, the transformer may only include the shield winding N3 wound in parallel with the first winding N1. In another embodiment, the transformer may only include the shield winding N3 distributed between the first winding N1 and the second winding N2. In yet another embodiment, the same shield winding N3 can be wound in parallel with one type of first winding (e.g., primary winding N11) and also distributed between another type of first winding (e.g., power supply winding N12) and the second winding N2. In another embodiment, multiple groups of shield windings in the transformer can be configured such that at least one shield winding is wound in parallel with the first winding N1 and at least one shield winding is distributed between the first winding N1 and the second winding N2.

Figure 18:
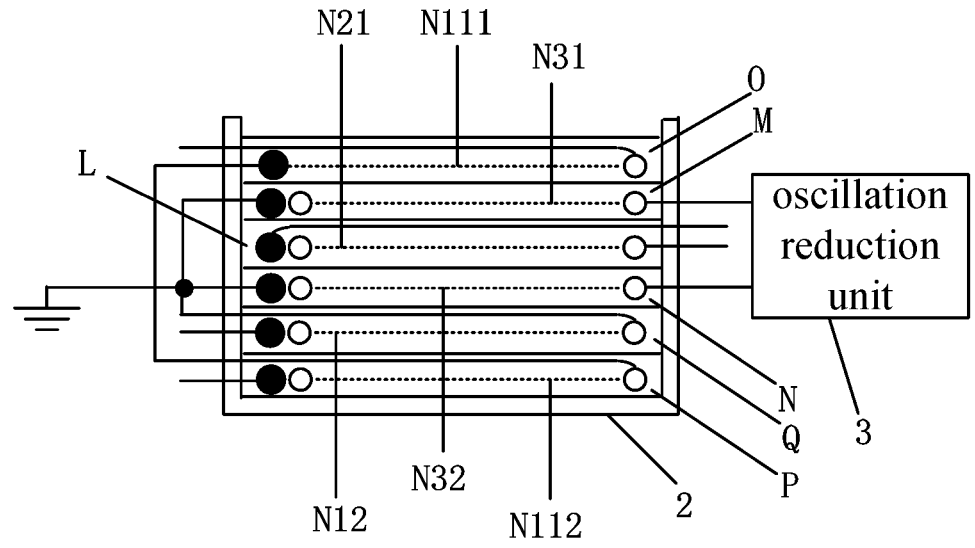
FIG. 18 is a ninth schematic construction diagram of a switching power supply in an embodiment of the present disclosure.
Figure 19:
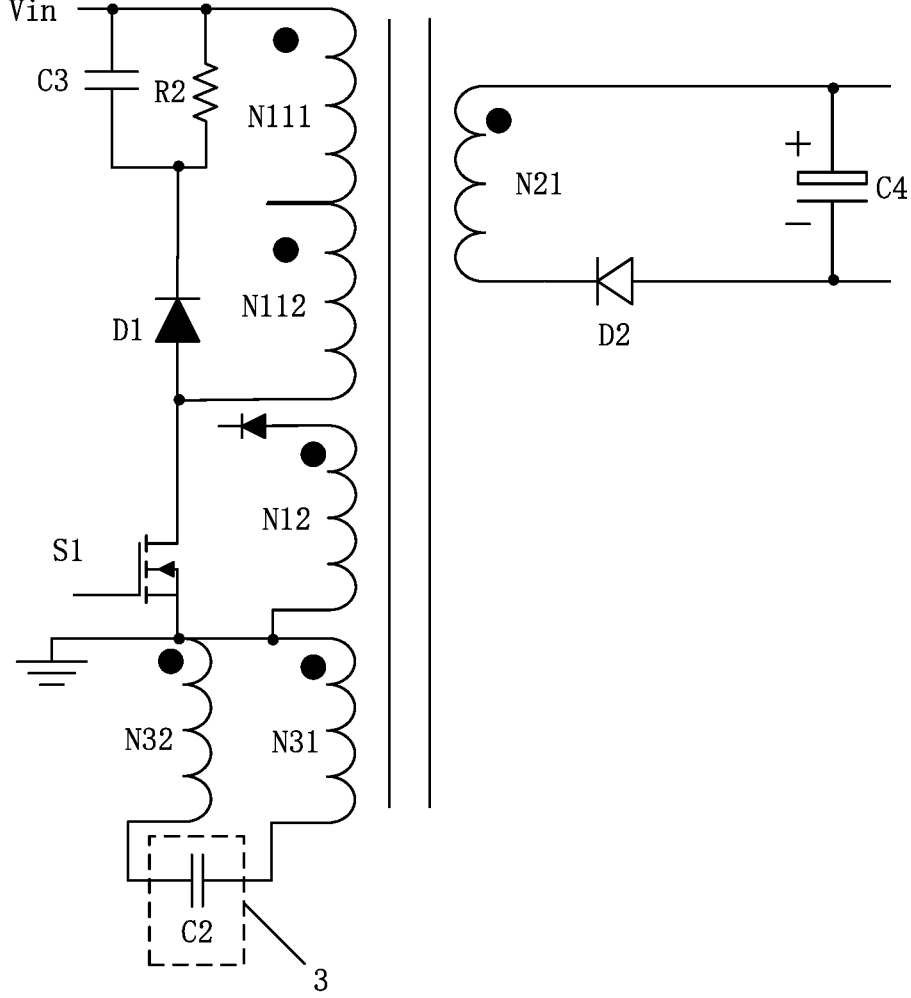
FIG. 19 is a ninth schematic circuit diagram of a switching power supply in an embodiment of the present disclosure.

The shield windings N3 are located on the primary side of the transformer, and at least one end of each of the shield windings is connected to an oscillation reduction unit 3 used for eliminating or reducing oscillations. In the embodiments shown in FIG. 1 and FIG. 2, the oscillation reduction unit 3 is shown connected in parallel to both ends of each of the shield windings. In other embodiments (e.g., as shown in FIG. 18 and FIG. 19), the oscillation reduction unit 3 may be connected to only one end of each of the shield windings.

The present invention creatively discovers that there is also leakage inductance and coupling capacitance between the shield windings and the first winding (e.g., primary winding) of the transformer. Consequently, oscillations can occur during the turning on and off of the switch tube on the primary side of the transformer, caused by the leakage inductance and distributed capacitance. These oscillations will cause an increase of EMI at corresponding points. Based on this discovery, the present invention connects an oscillation reduction unit to the shield winding, which effectively reducing or avoiding the increase of EMI caused by oscillations. In specific embodiments, the oscillation reduction unit adopts capacitors (in some examples, also include resistors), which can effectively reduce the EMI of critical points at a lower cost by simply introducing capacitors (or capacitors and resistors) Specifically, the oscillation formed by stray capacitance and leakage inductance can be absorbed to reduce conducted EMI and radiated EMI Wherein the reduction in EMI can be understood as a reduction in EMI interference.

In one embodiment, as shown in FIG. 2 to FIG. 5, FIG. 9 to FIG. 12, FIG. 16, and FIG. 17, the oscillation reduction unit 3 includes a first capacitor C1 connected in parallel, either directly or indirectly, to both ends of each of the shield windings.

In another embodiment, as shown in FIG. 17, FIG. 12, FIG. 11, FIG. 10, FIG. 5, and FIG. 6, the oscillation reduction unit 3 may further include a first resistor R1. The first capacitor C1 is connected in series with the first resistor R1 and then connected in parallel to both ends of each of the shield windings.

In yet another embodiment, as shown in FIG. 19, there are two groups of shield windings. The oscillation reduction unit includes a second capacitor C2, which is connected between the first ends of the two groups of shield windings. The second ends of the two groups of shield windings are either grounded or connected to the power input terminal.

The above examples illustrate three different constructions of the oscillation reduction unit 3. The quantity and size of the first resistor R1 and the first capacitor C1 in the oscillation reduction unit 3 can be varied according to the requirements. The oscillation reduction unit 3 can also incorporate other components to achieve the desired effect, not limited to the examples mentioned here.

The specific values of the first capacitor C1, first resistor R1, and second capacitor C2 can be determined through experimentation.

Furthermore, in some cases where there are multiple groups of shield windings and oscillation reduction units, each oscillation reduction unit can have the same or similar construction (e.g., using a first capacitor C1 in series with a first resistor R1), or different constructions can be used simultaneously. For example, one oscillation reduction unit can use only the first capacitor C1, while another oscillation reduction unit can use the first capacitor C1 in series with the first resistor R1.

Among them, compared to the scheme of simultaneously using the first capacitor C1 and the first resistor R1, the scheme of only using the first capacitor C1 (or the second capacitor C2) can effectively simplify the circuit, reduce costs and reduce circuit size. At the same time, the scheme of using the first capacitor C1 and the first resistor R1 can effectively ensure the reduction effect of EMI.

In one embodiment, as shown in FIG. 7 to FIG. 12, the winding unit of the Lth layer of the multilayer winding unit comprises the second winding N2 (e.g., secondary winding N21). Wherein, L is a positive integer, meaning L is greater than or equal to 1.

The number of shield windings N3 is one group, and the winding unit of the Nth layer of the multi-layer winding structure comprises the shielding winding N3. The quantity of the first winding N1 is at least two groups, wherein two groups of the first winding N1 are the primary winding N11 and the power supply winding N12, wherein N is a positive integer greater than L.

The winding unit of the Jth layer of the multi-layer winding structure includes the first winding N1, which is the primary winding N11. The winding unit of the Kth layer of the multi-layer winding structure comprises the first winding N1, which is the power supply winding N12.

In one example, J is a positive integer greater than or equal to N, and K is a positive integer greater than J. Specifically, when J is equal to N, it means the shield winding N3 and the primary winding N11 are wound in parallel. When J is greater than N, it means the shield winding N3 is located between the primary winding N11 and the second winding (e.g., secondary winding N21).

In another example, K is a positive integer greater than or equal to N, and J is a positive integer greater than K. Specifically, when K is equal to N, it means the shield winding N3 and the power supply winding N12 are wound in parallel. When K is greater than N, it means the shield winding N3 is located between the power supply winding N12 and the second winding (e.g., secondary winding N21).

Figure 8:
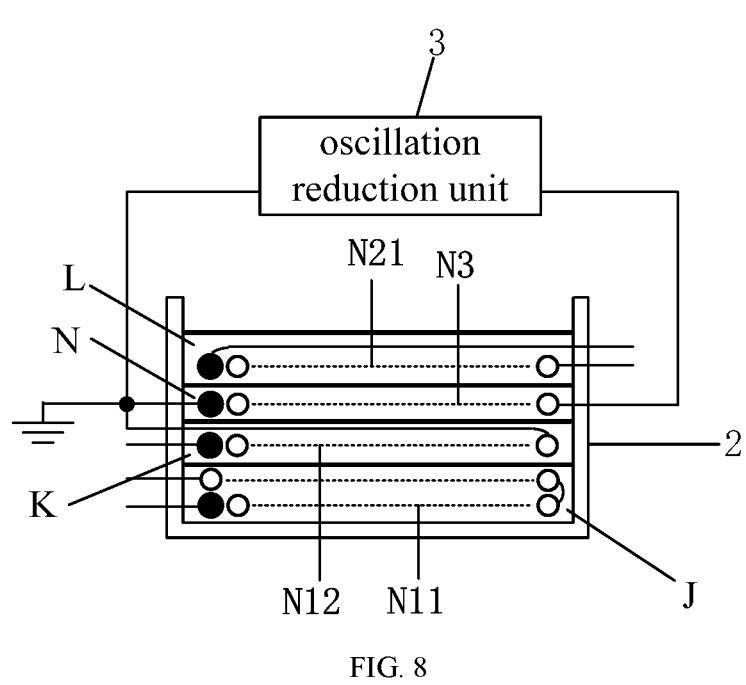
FIG. 8 is a seventh schematic construction diagram of a switching power supply in an embodiment of the present disclosure.
Figures 9, 10:
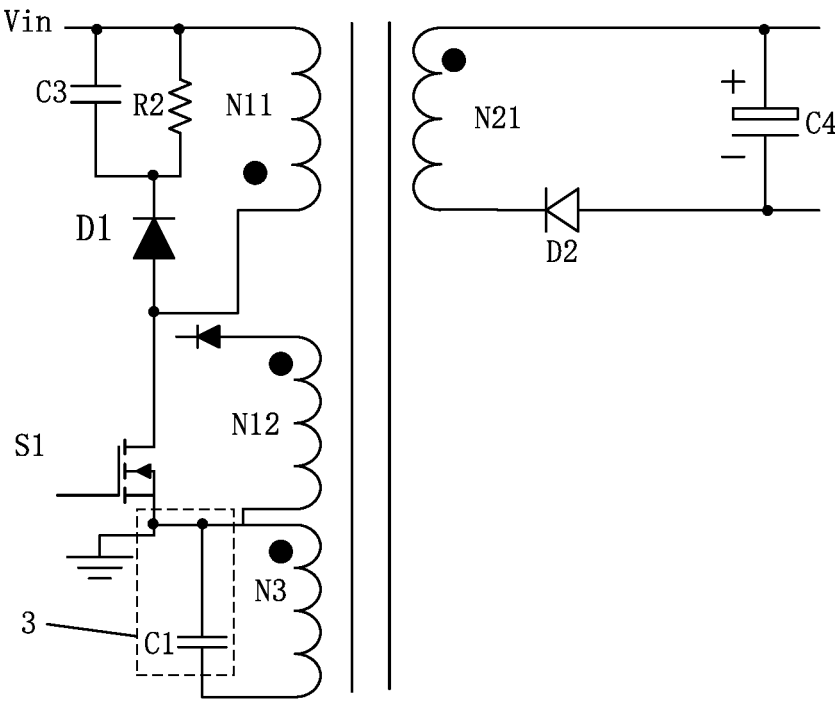
FIG. 9 is a second schematic circuit diagram of a switching power supply in an embodiment of the present disclosure.
FIG. 10 is a third schematic circuit diagram of a switching power supply in an embodiment of the present disclosure.

In the example shown in FIG. 8, L=1, N=2, K=3, J=4, which allows for the stacking of the winding unit of the first layer (including the secondary winding N21), the winding unit of the second layer (including the shield winding N3), the winding unit of the third layer (including the power supply winding N12), and the winding unit of the fourth layer (including the primary winding N11).

In contrast to the example in FIG. 8, the winding unit of the Lth layer, the winding unit of the Nth layer, the winding unit of the Kth layer and the winding unit of the Jth layer can be adjacent to each other, or in other examples, they can be non-adjacent. For example, in the multi-layer winding structure, there can be other winding units between the winding unit of the Lth layer and the winding unit of the Nth layer, as well as between the winding unit of the Jth layer and the winding unit of the Kth layer. Other winding units can also be arranged between the winding unit of the Nth layer and the subsequent the winding unit of the Jth layer or the winding unit of the Kth layer.

The above embodiments can be understood as a sequential structure of the transformer.

In one embodiment, as shown in FIG. 14 to FIG. 19, the winding unit of the Lth layer the multi-layer winding structure comprises the second winding N2 (e.g., secondary winding N21). Wherein, L is a positive integer greater than or equal to 2.

The number of shield windings N3 is two groups, namely the first shield winding N31 and the second shield winding N32. The winding unit of the Mth layer of the multi-layer winding structure includes the first shield winding N31, and the winding unit of the Nth layer of the multi-layer winding structure comprises the shielding winding N32. One end of the first shield winding N31 is connected in common with one end of the second shield winding N32 to the first winding, for example, as shown in FIG. 14 to FIG. 19, they are connected in common to the power supply winding N12 (i.e., one type of the first winding N1). Wherein, M is a positive integer less than L, and N is a positive integer greater than L, that is M<L<N. Thus, the second winding (e.g., secondary winding) is located between the first shield winding N31 and the second shield winding N32.

The quantity of the first winding N1 is three groups, namely the first primary winding N111, the second primary winding N112, and the power supply winding N12. The first primary winding N111 and the second primary winding N112 are connected in series. The winding unit of the Oth layer of the multi-layer winding structure includes the first primary winding N111, the winding unit of the Pth layer of the multi-layer winding structure includes the second primary winding N112, and the winding unit of the Qth layer of the multi-layer winding structure includes the power supply winding N12.

Wherein, O is a positive integer less than or equal to M. This can be understood as the first shield winding N31 being located between the first primary winding N111 and the second winding (e.g., secondary winding N21).

In one example, Q is a positive integer greater than or equal to N, and P is a positive integer greater than Q. Specifically, when Q equals N, it means the power supply winding N12 is wound in parallel with the second shield winding N32. When Q is greater than N, it means the second shield winding N32 is located between the power supply winding N12 and the second winding (e.g., secondary winding N21).

In another example, P is a positive integer greater than or equal to N, and Q is a positive integer greater than J. Specifically, when P equals N, it means the second primary winding N112 is wound in parallel with the second shield winding N32. When P is greater than N, it means the second shield winding N32 is located between the power supply winding N12 and the second winding (e.g., secondary winding N21).

Figure 15:
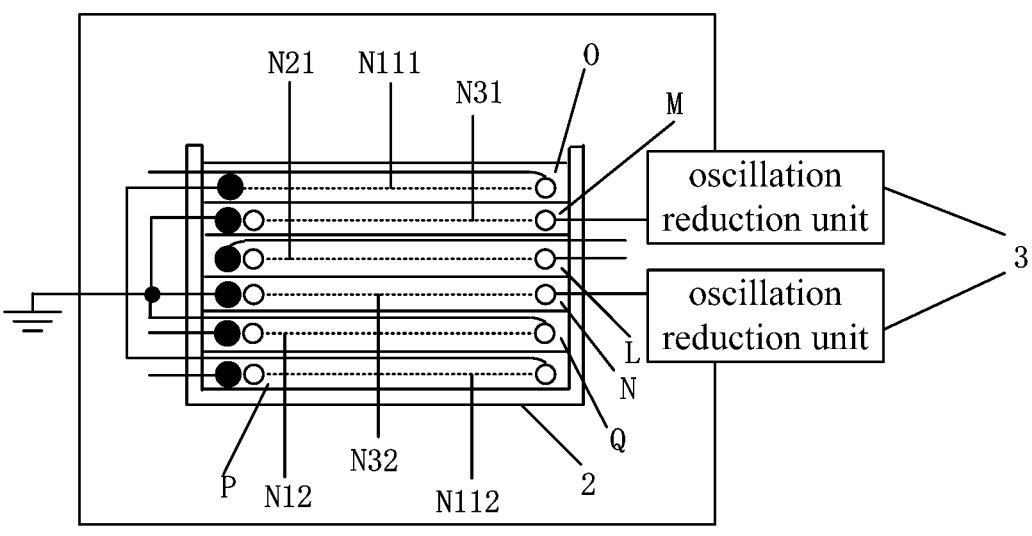
FIG. 15 is a eighth schematic construction diagram 8 of a switching power supply in an embodiment of the present disclosure.
Figure 16:
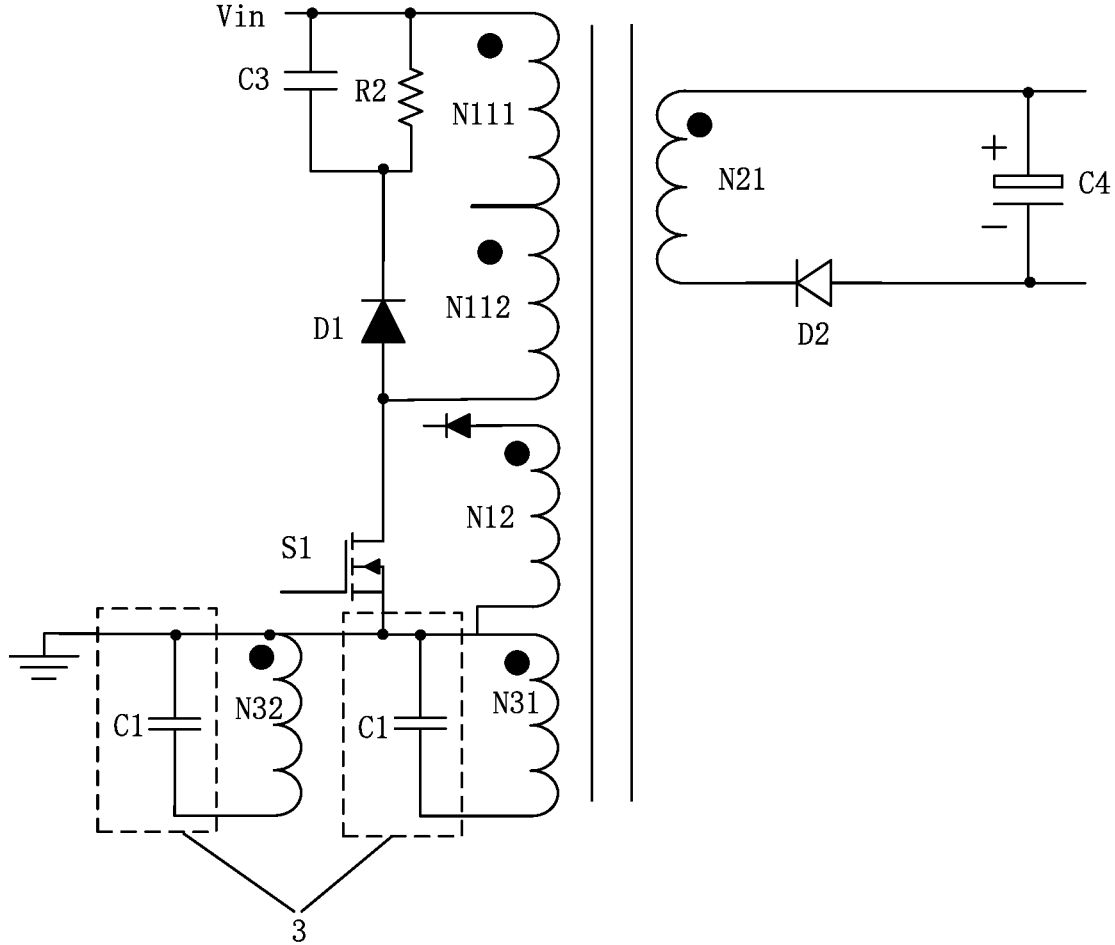
FIG. 16 is a seventh schematic circuit diagram of a switching power supply in an embodiment of the present disclosure.
Figure 17:
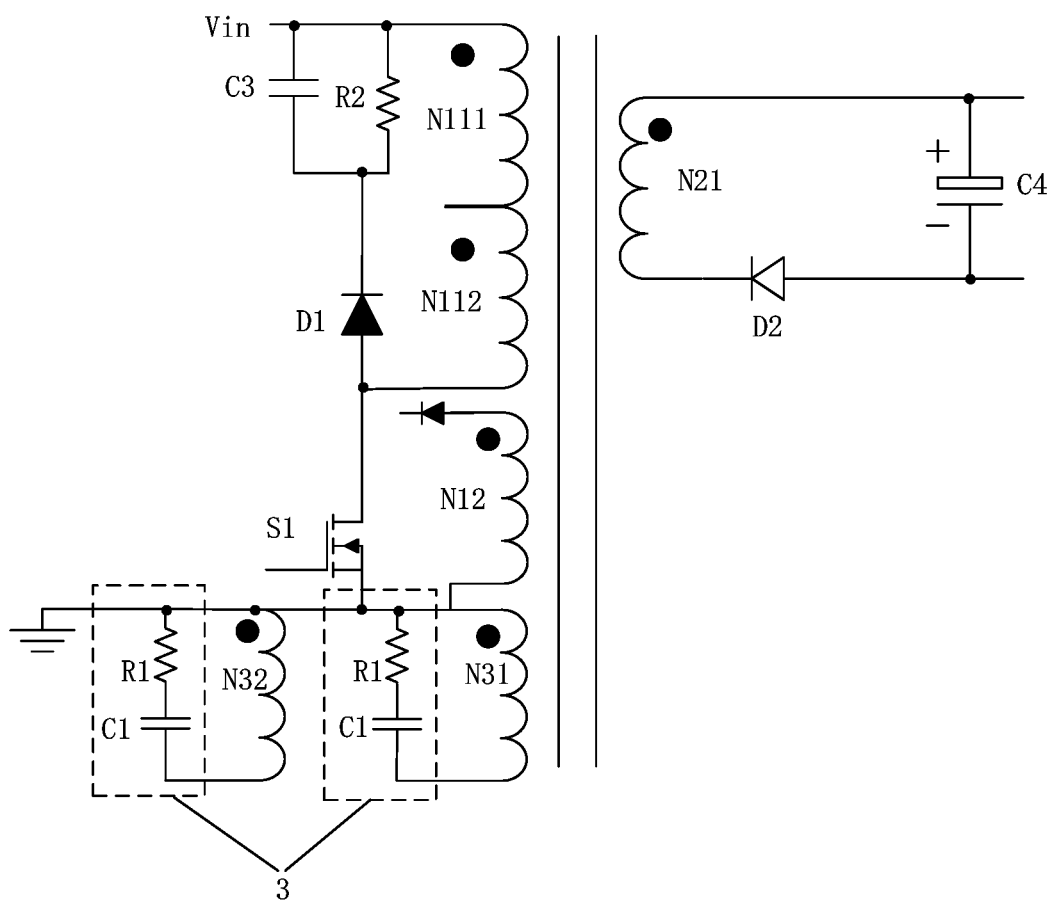
FIG. 17 is a eighth schematic circuit diagram of a switching power supply in an embodiment of the present disclosure.

In the example shown in FIG. 15, O=1, M=2, L=3, N=4, Q=5, P=6, which allows for the stacking of the winding unit of the first layer (including the first primary winding N111), the winding unit of the second layer (including the first shield winding N31), the winding unit of the third layer (including the secondary winding N21), the winding unit of the fourth layer (including the second shield winding N32), the winding unit of the fifth layer (including the power supply winding N12), and the winding unit of the sixth layer (including the second primary winding N112).

In contrast to the example shown in FIG. 15, the winding unit of the Oth layer, the winding unit of the Mth layer, the winding unit of the Lth layer, the winding unit of the Nth layer, the winding unit of the Pth layer, and the winding unit of the Qth layer can be adjacent to each other. In other examples, they can also be non-adjacent.

The above embodiments can be understood as a sandwich structure of the transformer. The first primary winding N111 can be understood as half of the primary winding of the transformer, and the second primary winding N112 is the other half of the primary winding. The first shield winding N31 and the second shield winding N32 are two shield windings, which can have different or equal numbers of turns. In the sandwich structure, the shield windings are placed on both sides of the secondary winding to shield and balance the common-mode current between the primary and secondary. Sometimes, the power supply winding and the shield winding can also be wound in parallel.

In one embodiment, as shown in FIG. 7, FIG. 9 to FIG. 12, FIG. 14, and FIG. 16 to FIG. 19, one end of the primary winding (e.g., primary winding N11, such as the first primary winding N111 and the second primary winding N112) is directly or indirectly connected to the power input terminal Vin. The second end of the primary winding (e.g., primary winding N11, such as the first primary winding N111 and the second primary winding N112) is directly or indirectly connected to the first terminal of the switch S1, and the second terminal of the switch S1 is connected to the ground terminal.

In the examples shown in FIG. 14 to FIG. 19 and FIG. 7 to FIG. 10, one end of each shield winding (e.g., shield winding N3, the first shield winding N31, and the second shield winding N32) is connected to the ground terminal.

Figure 11:
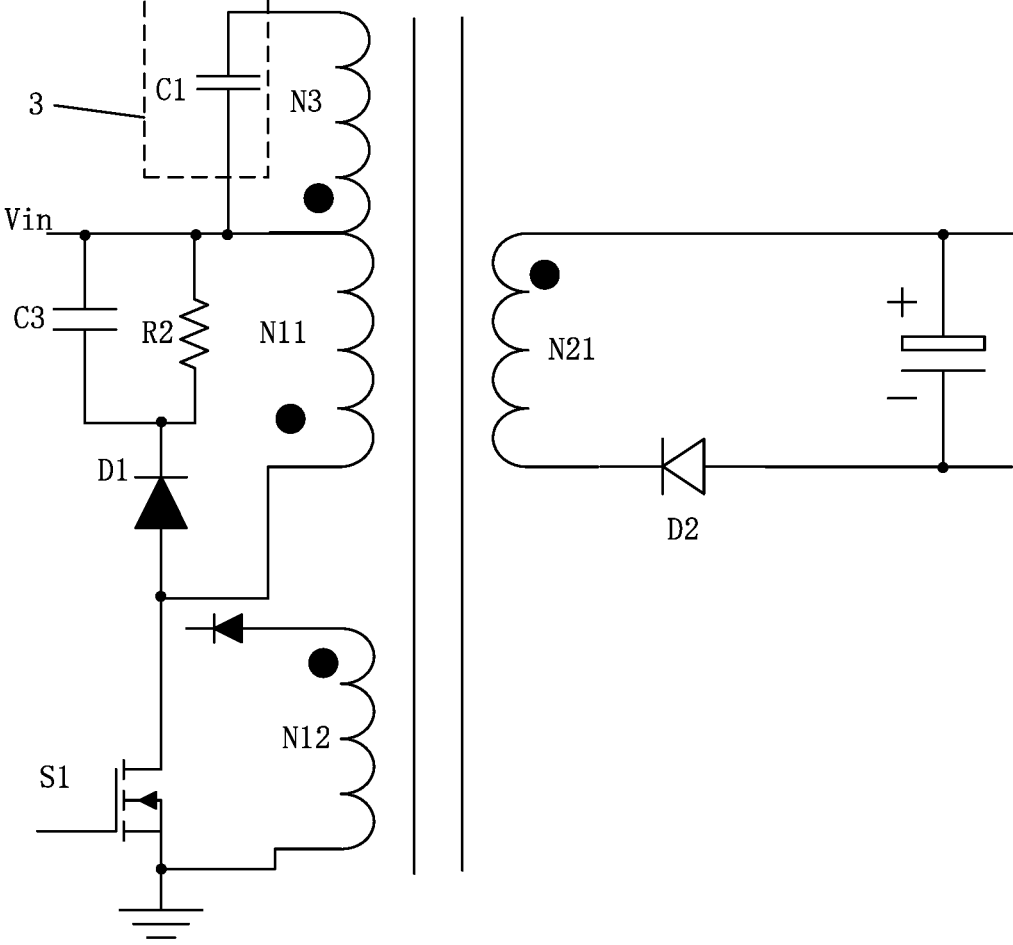
FIG. 11 is a fourth schematic circuit diagram of a switching power supply in an embodiment of the present disclosure.
Figure 12:
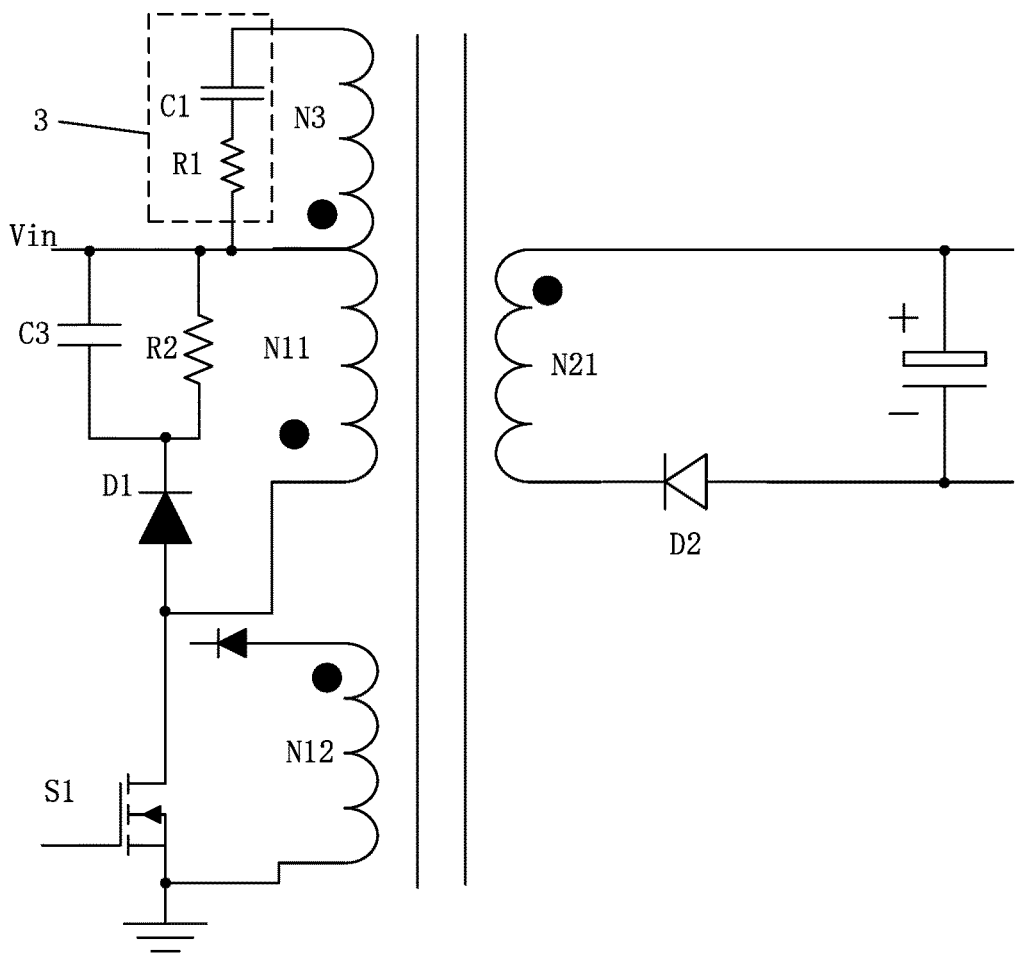
FIG. 12 is a fifth schematic circuit diagram of a switching power supply in an embodiment of the present disclosure.

In the examples shown in FIG. 11 and FIG. 12, one end of each shield winding (e.g., shield winding N3) is connected to the power input terminal Vin. In FIG. 11 and FIG. 12, only the case where there is one group of shield windings connected to the power input terminal Vin is illustrated. In other examples, when there are multiple groups of shield windings, all the shield windings can be connected to the power input terminal Vin.

The oscillation reduction unit is specifically used to eliminate or weaken oscillations when the switch is turned on or off.

In further examples, as shown in FIG. 7, FIG. 9 to FIG. 12, FIG. 14, and FIG. 16 to FIG. 19, the switching power supply also includes a second resistor R2, a third capacitor C3, a first diode D1, a second diode D2, and a fourth capacitor C4. The second winding N2 is the secondary winding N21 of the transformer.

The first end of the second resistor R2 after connected in parallel with the third capacitor C3 is connected to the power input terminal Vin. The second end of the second resistor R2 is connected to the negative electrode of the first diode D1. The positive electrode of the first diode D1 is connected to the first terminal of the switch S1. The first end of the fourth capacitor C4 is connected to the first end of the secondary winding N21. The second end of the fourth capacitor C4 is connected to the positive electrode of the second diode D2. The negative electrode of the second diode D2 is connected to the second end of the secondary winding N21.

In one embodiment, as shown in FIG. 13, in the case where the shield winding N3 is wound in parallel with the primary winding N11, in one layer where the shield winding N3 (which can also be understood as the first shield winding N31 or the second shield winding N32) of the planar transformer is located, the turn starts from point B in a clockwise direction is the first turn of the primary winding N11, and the turn starts from the point B in a counterclockwise direction is the first turn of the shield winding N3. There can be multiple turns as required. An RC absorption (i.e., the first resistor and the first capacitor connected in series) can be added between the lead-out point of the shield winding N3 and the point B on the planar transformer or on the PCB where the pins are located. The shield winding can also occupy a separate layer, and the number of turns can be determined as needed, which does not affect the principle of adding an RC absorption to absorb and improve EMI. At the same time, it can effectively save space.

The embodiments of the present invention also provide an electronic device comprising the switching power supply described in the optional embodiments above. The electronic device may further include a power consumption unit that is directly or indirectly connected to the secondary side of the switching power supply to obtain power supply from the switching power supply.

Figure 20:
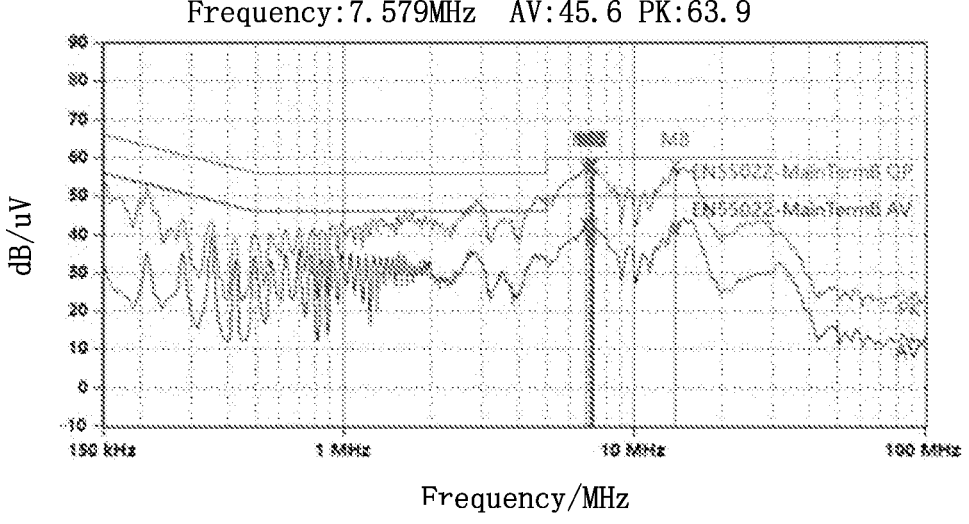
FIG. 20 is a schematic diagram illustrating the EMI test results without introducing an oscillation reduction unit.

Referring to FIG. 20, in the absence of the oscillation reduction unit 3, it is still difficult to pass at certain points of conduction and certain points of radiation. For example, at the point of 7.3 MHz in FIG. 20, there are many oscillations in the high-frequency range after 30 MHz, indicating poor radiation performance.

Figure 21:
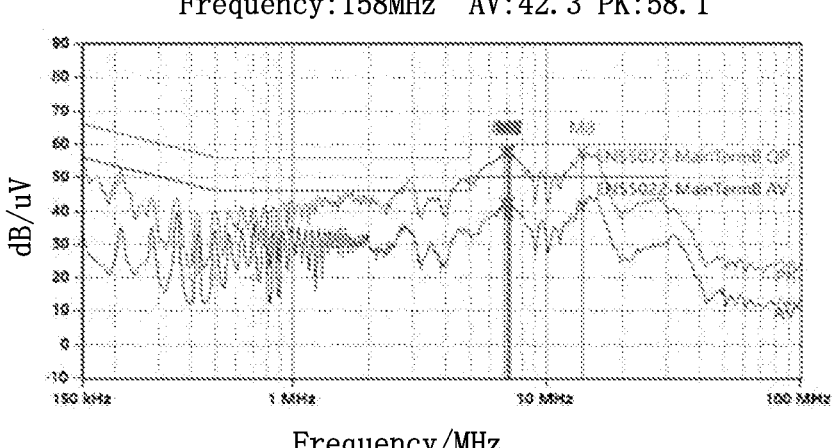
FIG. 21 is a schematic diagram illustrating the EMI test results with the introduction of the oscillation reduction unit.

In contrast, when using the specific embodiment of the oscillation reduction unit 3 of the present invention, as shown in FIG. 21, it can be observed that the EMI value is significantly reduced at the point of 7.3 MHz and after 30 MHz, passing the conduction test. The value after 30 MHz is also greatly reduced. Since radiation is determined by the common-mode current after 30 MHz, the radiation is also significantly reduced.

In the description of this specification, the descriptive terms "one embodiment," "one example," "specific implementation process," "one example," and the like refer to specific features, structures, materials, or characteristics described in conjunction with this embodiment or example and are included in at least one embodiment or example of the present invention. In this specification, the illustrative expressions of the above terms do not necessarily refer to the same embodiment or example. Moreover, the specific features, structures, materials, or characteristics described can be appropriately combined in any one or more embodiments or examples.

Finally, it should be noted that the above embodiments are only used to illustrate the technical solutions of the present invention, but not to limit the present invention. Although the present invention has been described in detail with reference to the foregoing embodiments, a person of ordinary skill in the art shall understand that modifications may be made to the technical solutions described in the foregoing embodiments, or some or all of the technical features thereof may be equivalently substituted. However, these modifications or substitutions do not essentially depart the corresponding technical solutions from the scope of the technical solutions of the embodiments of the present invention.

The invention claimed is:

1. A switching power supply, including a transformer, wherein the transformer includes a frame, and the transformer further includes a multi-layer winding structure arranged on the frame, and different winding units of the multi-layer winding structure are distributed at intervals along a target direction;

at least one winding unit of the multi-layer winding structure includes a first winding of a primary side of the transformer; at least one winding unit of the multi-layer winding structure includes a second winding of a secondary side of the transformer; at least one winding unit of the multi-layer winding structure includes a shielding winding;

in the multi-layer winding structure, at least one group of shielding windings is wound in parallel in the same layer as the first winding, and/or: at least one group of shielding windings is distributed between the first winding and the second winding;

wherein the shielding winding is located on the primary side of the transformer; at least one end of the shielding winding is connected with an oscillation reduction unit for eliminating or weakening oscillation.

2. The switching power supply according to claim 1, wherein the oscillation reduction unit includes a first capacitor directly or indirectly connected in paralleled to both ends of the shielding winding.

3. The switching power supply according to claim 2, wherein at least one oscillation reduction unit further includes a first resistor, the first capacitor is connected in series with the first resistor and then connected in parallel to both ends of the shield winding.

4. The switching power supply according to claim 3, wherein the winding unit of the Lth layer of the multi-layer winding structure comprises the second winding;

the number of shielding windings is one group, and the winding unit of the Nth layer of the multi-layer winding structure comprises the shielding winding;

the number of first windings is at least two groups, two groups of which are respectively a primary winding and a power supply winding;

the winding unit of the Jth layer of the multi-layer winding structure comprises the first winding, which is the primary winding, the winding unit of the Kth layer of the multi-layer winding structure comprises the first winding, which is the power supply winding;

wherein L is a positive integer, and N is a positive integer greater than L;

wherein J is a positive integer greater than or equal to N, K is a positive integer greater than J, or: K is a positive integer greater than or equal to N, and J is a positive integer greater than K.

5. The switching power supply according to claim 3, wherein the winding unit of the Lth layer of the multi-layer winding structure comprises the second winding;

the number of shielding windings is two groups, which are respectively a first shielding winding and a second shielding winding; the winding unit of the Mth layer of the multi-layer winding structure comprises the first shielding winding, and the winding unit of the Nth layer of the multi-layer winding structure comprises the second shielding winding; a first end of the first shielding winding and a first end of the second shielding winding are commonly connected to the first winding;

the number of first windings is three groups, which are a first primary winding, a second primary winding, and a power supply winding; the first primary winding and the second primary winding are connected in series, and the winding unit of the Oth layer of the multi-layer winding structure comprises the first primary winding, the Pth winding unit of the multi-layer winding structure comprises the second primary winding, and the Qth winding unit of the multi-layer winding structure comprises the power supply winding;

wherein, L is a positive integer greater than or equal to 2, M is a positive integer less than L, N is a positive integer greater than L, and O is a positive integer less than or equal to M;

Q is a positive integer greater than or equal to N, P is a positive integer greater than Q, or: P is a positive integer greater than or equal to N, Q is a positive integer greater than J.

6. The switching power supply according to claim 3, wherein one of the first winding is a primary winding of the transformer, a first end of the primary winding is directly or indirectly connected to the power input terminal, a second end of the primary winding is directly or indirectly connected to a first end of a switch tube, a second end of the switch tube is connected to the ground terminal;

one end of each shielding winding is connected to the ground terminal, or one end of each shielding winding is connected to the power input terminal;

the oscillation reduction unit is specifically used to eliminate or weakening oscillation when the switch tube is turned on and turned off.

7. The switching power supply according to claim 2, wherein the winding unit of the Lth layer of the multi-layer winding structure comprises the second winding;

the number of shielding windings is one group, and the winding unit of the Nth layer of the multi-layer winding structure comprises the shielding winding;

the number of first windings is at least two groups, two groups of which are respectively a primary winding and a power supply winding;

the winding unit of the Jth layer of the multi-layer winding structure comprises the first winding, which is the primary winding, the winding unit of the Kth layer of the multi-layer winding structure comprises the first winding, which is the power supply winding;

wherein L is a positive integer, and N is a positive integer greater than L;

wherein J is a positive integer greater than or equal to N, K is a positive integer greater than J, or: K is a positive integer greater than or equal to N, and J is a positive integer greater than K.

8. The switching power supply according to claim 2, wherein the winding unit of the Lth layer of the multi-layer winding structure comprises the second winding;

the number of shielding windings is two groups, which are respectively a first shielding winding and a second shielding winding; the winding unit of the Mth layer of the multi-layer winding structure comprises the first shielding winding, and the winding unit of the Nth layer of the multi-layer winding structure comprises the second shielding winding; a first end of the first shielding winding and a first end of the second shielding winding are commonly connected to the first winding;

the number of first windings is three groups, which are a first primary winding, a second primary winding, and a power supply winding; the first primary winding and the second primary winding are connected in series, and the winding unit of the Oth layer of the multi-layer winding structure comprises the first primary winding, the Pth winding unit of the multi-layer winding structure comprises the second primary winding, and the Qth winding unit of the multi-layer winding structure comprises the power supply winding;

wherein, L is a positive integer greater than or equal to 2, M is a positive integer less than L, N is a positive integer greater than L, and O is a positive integer less than or equal to M;

Q is a positive integer greater than or equal to N, P is a positive integer greater than Q, or: P is a positive integer greater than or equal to N, Q is a positive integer greater than J.

9. The switching power supply according to claim 2, wherein one of the first winding is a primary winding of the transformer, a first end of the primary winding is directly or indirectly connected to the power input terminal, a second end of the primary winding is directly or indirectly connected to a first end of a switch tube, a second end of the switch tube is connected to the ground terminal;

one end of each shielding winding is connected to the ground terminal, or one end of each shielding winding is connected to the power input terminal;

the oscillation reduction unit is specifically used to eliminate or weakening oscillation when the switch tube is turned on and turned off.

10. The switching power supply according to claim 1, wherein the number of shielding windings is two groups, the oscillation reduction unit includes a second capacitor, the second capacitor is connected between first ends of the two groups of shielding windings, second ends of the two groups of shielding windings are connected to the ground terminal or the power input terminal.

11. The switching power supply according to claim 10, wherein the winding unit of the Lth layer of the multi-layer winding structure comprises the second winding;

the number of shielding windings is one group, and the winding unit of the Nth layer of the multi-layer winding structure comprises the shielding winding;

the number of first windings is at least two groups, two groups of which are respectively a primary winding and a power supply winding;

the winding unit of the Jth layer of the multi-layer winding structure comprises the first winding, which is the primary winding, the winding unit of the Kth layer of the multi-layer winding structure comprises the first winding, which is the power supply winding;

wherein L is a positive integer, and N is a positive integer greater than L;

wherein J is a positive integer greater than or equal to N, K is a positive integer greater than J, or: K is a positive integer greater than or equal to N, and J is a positive integer greater than K.

12. The switching power supply according to claim 10, wherein the winding unit of the Lth layer of the multi-layer winding structure comprises the second winding;

the number of shielding windings is two groups, which are respectively a first shielding winding and a second shielding winding; the winding unit of the Mth layer of the multi-layer winding structure comprises the first shielding winding, and the winding unit of the Nth layer of the multi-layer winding structure comprises the second shielding winding; a first end of the first shielding winding and a first end of the second shielding winding are commonly connected to the first winding;

the number of first windings is three groups, which are a first primary winding, a second primary winding, and a power supply winding; the first primary winding and the second primary winding are connected in series, and the winding unit of the Oth layer of the multi-layer winding structure comprises the first primary winding, the Pth winding unit of the multi-layer winding structure comprises the second primary winding, and the Qth winding unit of the multi-layer winding structure comprises the power supply winding;

wherein, L is a positive integer greater than or equal to 2, M is a positive integer less than L, N is a positive integer greater than L, and O is a positive integer less than or equal to M;

Q is a positive integer greater than or equal to N, P is a positive integer greater than Q, or: P is a positive integer greater than or equal to N, Q is a positive integer greater than J.

13. The switching power supply according to claim 10, wherein one of the first winding is a primary winding of the transformer, a first end of the primary winding is directly or indirectly connected to the power input terminal, a second end of the primary winding is directly or indirectly connected to a first end of a switch tube, a second end of the switch tube is connected to the ground terminal;

one end of each shielding winding is connected to the ground terminal, or one end of each shielding winding is connected to the power input terminal;

the oscillation reduction unit is specifically used to eliminate or weakening oscillation when the switch tube is turned on and turned off.

14. The switching power supply according to claim 1, wherein the winding unit of the Lth layer of the multi-layer winding structure comprises the second winding;

the number of shielding windings is one group, and the winding unit of the Nth layer of the multi-layer winding structure comprises the shielding winding;

the number of first windings is at least two groups, two groups of which are respectively a primary winding and a power supply winding;

the winding unit of the Jth layer of the multi-layer winding structure comprises the first winding, which is the primary winding, the winding unit of the Kth layer of the multi-layer winding structure comprises the first winding, which is the power supply winding;

wherein L is a positive integer, and N is a positive integer greater than L;

wherein J is a positive integer greater than or equal to N, K is a positive integer greater than J, or: K is a positive integer greater than or equal to N, and J is a positive integer greater than K.

15. The switching power supply according to claim 14, Wherein, L=1, N=2; and

J=3, K=4, or: J=4, K=3.

16. The switching power supply according to claim 1, wherein the winding unit of the Lth layer of the multi-layer winding structure comprises the second winding; the number of shielding windings is two groups, which are respectively a first shielding winding and a second shielding winding; the winding unit of the Mth layer of the multi-layer winding structure comprises the first shielding winding, and the winding unit of the Nth layer of the multi-layer winding structure comprises the second shielding winding; a first end of the first shielding winding and a first end of the second shielding winding are commonly connected to the first winding;

the number of first windings is three groups, which are a first primary winding, a second primary winding, and a power supply winding; the first primary winding and the second primary winding are connected in series, and the winding unit of the Oth layer of the multi-layer winding structure comprises the first primary winding, the Pth winding unit of the multi-layer winding structure comprises the second primary winding, and the Qth winding unit of the multi-layer winding structure comprises the power supply winding;

wherein, L is a positive integer greater than or equal to 2, M is a positive integer less than L, N is a positive integer greater than L, and O is a positive integer less than or equal to M;

Q is a positive integer greater than or equal to N, P is a positive integer greater than Q, or: P is a positive integer greater than or equal to N, Q is a positive integer greater than J.

17. The switching power supply according to claim 16, wherein L=3, M=2, N=4, O=1; and P=5, Q=6, or: Q=5, P=6.

18. The switching power supply according to claim 1, wherein one of the first winding is a primary winding of the transformer, a first end of the primary winding is directly or indirectly connected to the power input terminal, a second end of the primary winding is directly or indirectly connected to a first end of a switch tube, a second end of the switch tube is connected to the ground terminal;

one end of each shielding winding is connected to the ground terminal, or one end of each shielding winding is connected to the power input terminal;

the oscillation reduction unit is specifically used to eliminate or weakening oscillation when the switch tube is turned on and turned off.

19. The switching power supply according to claim 18, further includes a second resistor, a third capacitor, a first diode, a second diode, and a fourth capacitor; the second winding is a secondary winding of the transformer;

a first end of the second resistor after connected in parallel with the third capacitor is connected to the power input terminal, and a second end of which is connected to a negative electrode of the first diode, a positive electrode of the first diode is connected to the first end of the switch tube, a first end of the fourth capacitor is connected to a first end of the secondary winding, a second end of the fourth capacitor is connected to a positive electrode of the second diode, a negative electrode of the second diode is connected to a second end of the secondary winding.

20. An electronic device, comprising the switching power supply according to claim 1.

* * * * *